United States Patent [19]

Ingalls

[11] Patent Number: 4,938,672
[45] Date of Patent: Jul. 3, 1990

[54] SCREW ROTOR LOBE PROFILE FOR SIMPLIFIED SCREW ROTOR MACHINE CAPACITY CONTROL

[75] Inventor: Robert A. Ingalls, Springfield, Vt.

[73] Assignee: Excet Corporation, Springfield, Vt.

[21] Appl. No.: 354,526

[22] Filed: May 19, 1989

[51] Int. Cl.$^5$ .............................................. F04C 2/16
[52] U.S. Cl. ..................................................... 418/201
[58] Field of Search ..................................... 418/201 B

[56] References Cited

U.S. PATENT DOCUMENTS

| | | | |
|---|---|---|---|
| 4,028,026 | 6/1977 | Menssen | 418/201 B |
| 4,053,263 | 10/1977 | Ingalls | 418/201 B |
| 4,445,831 | 5/1984 | Ingalls | 418/201 B |
| 4,508,496 | 4/1985 | Bowman | 418/201 B |
| 4,527,967 | 7/1985 | Ingalls | 418/201 B X |
| 4,643,654 | 2/1987 | Rinder | 418/201 B |

FOREIGN PATENT DOCUMENTS

| | | | |
|---|---|---|---|
| 73305 | 6/1979 | Japan | 418/201 B |
| 2106186 | 4/1983 | United Kingdom | 418/201 B |

*Primary Examiner*—Michael Koczo
*Assistant Examiner*—Douglas J. Makosy

*Attorney, Agent, or Firm*—Sughrue, Mion, Zinn, Macpeak & Seas

[57] ABSTRACT

Helical screw rotors for a screw rotor machine wherein, for both the male and female rotor, the rotor profile includes involute curves for the male and female rotor lobe tip portion and rotor root portion, thereby generating mating involute curved surfaces of the corresponding groove, root and tip portion for the female rotor, resulting in low leakage path between the high and low pressure volumes when the rotors are in mesh, and causing ramps on the lobe tips of both the male and female rotors to form high points thereof which act as sealing strips during intermesh rotation of the rotors and in conjunction with the screw rotor machine casing. The screw rotor machines are provided with capacity control variance for same drive rotor rpm by maintaining one rotor outside diameter, root diameter, and length to diameter ratio and basic lobe proportions the same, and with the same number of lobes while for the other rotor, the outside diameter, the root and pitch diameters, and the number of lobes are varied, while maintaining basic lobe proportions the same, with significant change in machine expansion or compression capacity for a compressible working fluid captured between the intermeshed helical screw rotors.

4 Claims, 6 Drawing Sheets

SCREW ROTOR LOBE PROFILE FOR SIMPLIFIED SCREW ROTOR MACHINE CAPACITY CONTROL

FIELD OF THE INVENTION

This invention relates to helical screw rotor machines for compression and expansion of a working fluid, and more particularly to improved screw rotor profile having particularly effective driving and driven lobe surfaces on intermeshed male and female rotors and the use of changes in the ratio of male to female lobes for varying the capacity of the helical screw rotor machine.

BACKGROUND OF THE INVENTION

Screw rotor machines employable, both for the compression or expansion of an elastic working fluid, have used asymmetric rotor profiles for improved efficiency of the compression or expansion process. Exemplary U.S. Patents include U.S. Pat. Nos. 3,423,017, 4,140,445 and 4,435,139, assigned to Svenska Rotor Maskiner; U.S. Pat. No. 4,053,263, No. 4,109,362 and 4,445,831 issued to the applicant and assigned to Joy Manufacturing Company; U.S. Pat. No. 4,527,967 issued to the applicant and assigned to Dunham-Bush, Incorporated; U.S. Pat. Nos. 4,401,420 and 4,406,602 assigned to Hitachi Corporation; U.S. Pat. Nos. 4,412,686 and 4,508,496 assigned to Ingersoll-Rand Company; and U.S. Pat. No. 4,028,026 assigned to Linde Aktiengesellschaft.

Screw rotor machines, whether functioning as compressors or expanders, are normally of a cast or machined casing or housing bearing two parallel, laterally intersecting cylindrical bores opening at respective ends to high and low pressure ports. Within the bores there are mounted for rotation, interengaging helical screw rotors of the male and female type respectively, provided with helical lobes or lands and intervening grooves having wrap angles normally less than 300°. Typically the male rotor is a rotor in which each lobe and groove has at least its major portion located outside the pitch circle of the rotor and has two generally convex flanks located outside of the pitch circle. The female comprises a rotor in which each lobe and groove has at least its major portion located inside of the pitch circle and has two generally concave flanks located inside of the pitch circle of the rotor.

The known patents covering asymmetric screw rotor machine utilize male and female rotor profiles which profiles are described by use of radial lines, arcs of circles, ellipses, trochoids, parabolas, involutes, hyperbolas and other geometric shapes forming portions of the lobe surfaces.

The manufacture of asymmetric screw rotor profile is not only complex, resulting in the use of expensive machinery, but require precise measuring of the surfaces having profiles of generated curves. The difficulty in measuring such surfaces accurately requires heavy dependence on the accuracy of the cutter, grinding and correctness of a Holroyd thread milling machine set up. The result is often the necessity of mating a female rotor with a particular male rotor, maintaining such mating through stocking and assembling procedures and leading to the necessity for replacing both rotors should one rotor be damaged. Attempts have been made in the past to utilize involute curves in the profiling of both the male and female screw rotors. Involute curves on the trailing lobe flanks of the male rotors and the trailing groove flanks of female rotors as set forth in applicant's U.S. Pat. Nos. 4,053,263, 4,109,362, and 4,445,831 permit the profiles of those patents to be produced on standard gear cutting or hobbing equipment. U.S. Pat. Nos. 4,412,796 and 4,508,496 employ an involute female leading groove portion and "generated" mating male leading lobe portions.

Additionally, screw rotor machines constructed in accordance with existing current practice are designed to fulfill a wide variety of compressor or expander capacity requirements. Capacity control has been previously accomplished by one or more of several methods. Capacity can be controlled by enlarging or reducing the size of rotors while maintaining basic rotor geometry including the numbers of lobes, male and female profiles and lobe proportions without changing length to diameter ratios (L/D). Alternatively, capacity can be controlled by increasing or decreasing the length to diameter ratios (L/D) of the rotors while maintaining rotor diameter sizes and geometry.

Capacity can also be controlled by increasing or decreasing the rotational speed of rotors without enlarging or reducing the size of the rotors or increasing or decreasing the length to diameter ratios (L/D). This has been accomplished by electrical control, i.e., changing the motor speed and mechanical control by changing the belt and pulley or gear drive from the motor to the compressor rotors.

Where conventionally, the rotors are male rotor driven, the four lobe male rotor, for instance, may drive a six lobe female rotor. By using a "female" drive with the female rotor having the larger number of lobes than the male rotor, machine capacity increases by 50%, assuming the same input rotational speeds to the drive rotor. However, it should be appreciated that the female rotor lobes are more fragile than the male rotor lobes and in addition total compressor power is transmitted through the rotor mesh in a "Female Drive" compressor as compared to approximately 16% of total compressor power transmitted through the rotor mesh in a "Male Drive" compressor, and the female rotor lobes may not be able to absorb the stress required as a female drive.

Digital computers have been utilized in the past to compute described geometrical figures for facilitating the creation of a screw rotor profile having sectional flank surfaces of interlinked geometrical figures. They have not to applicant's knowledge been used however to develop and define the actual screw rotor profiles for the male and female intermeshed rotors.

It is therefore a primary object of the present invention to provide improved high efficiency screw rotor profile utilizing modern computer technology to determine a series of curves which intersect a grouping of points defined by radial and angular, or by rectangular multiple coordinate dimensions.

It is a further object of the invention to provide a screw rotor machine having improved screw rotor profiles developed by digital computer technology and defined by rectangular or polar coordinates with the actual male and female rotor profile shapes and curvatures determined by "arc fit" programming on digital computers.

It is the further object of this invention to provide helical screw rotor machine utilizing improved screw rotor lobe surfaces common to male and female rotor and employed with different male and female rotor lobe combinations to increase or decrease the capacity of the screw rotor machines.

It is the further object of the invention to provide improved screw rotor profiles using involute curves for the male tip portion and root portion of the male rotor lobe leading flank mating with involute curves on the female rotor groove trailing flank root portion and tip portion, respectively, resulting in mating surfaces therebetween having low leakage paths and particularly applicable to computer program generation characterized by the ability to calculate coordinates for the rotors having a variety of lobe thicknesses and a number of lobes.

SUMMARY OF THE INVENTION

The present invention is directed to the formulation of particular male and female screw rotor lobe profiles, methods of computer described profiling of the rotors and the use of different male/female rotor lobe combinations to increase or decrease machine capacity. An elongated formed female rotor is adapted for rotation about its central axis and has a pitch circle centered on the axis and a root circle and an outer diameter. A plurality of elongated helical lobes extend longitudinally of the female rotor and are circumferentially spaced about the pitch circle so as to provide intervening grooves therebetween, forming addendum portions outside the pitch circle and dedendum portions inside the pitch circle. A major portion of each of the lobes extends generally radially inwardly of the pitch circle and the profile of each of the lobes in a plane perpendicular to the rotor axis has a tip portion and respective generally concave leading and trailing lobe portions extending intermediate said tip portion and a root portion of the respective adjacent groove. The lobes of the female rotor engage grooves of the male rotor defined by corresponding helical lobes of the male rotor with contact between the flank portions of respective male and female rotors during the rotation of one rotor relative to the other.

Likewise, the invention further resides in the female rotor profiles of both the leading and trailing flanks, tip and root portions of the female rotor defined and generated by convex and concave computer generated curves based on "X" and "Y" coordinates at points along the surface thereof. The improvement results additionally in varying the ratio of the male lobes of the male rotor to the female grooves of the female rotor to achieve an increase or decrease in compressor and/or expander capacity as described with respect to the male rotor above without materially changing the profiles of those lobes.

The present invention further resides in a pair of such male and female helical rotors for a screw rotor machine having the structure and characteristics described above.

According to the present invention the creation of compressor or expander rotors for a particular application is automatically implemented from the initial design stages through the design and manufacture of cutting tools and prototype and production rotors.

When using the present invention a designer first determines rotor size, lobe ratio and length/diameter ratio based upon screw rotor machine capacity and physical size requirements, desired volume curve characteristics and rotor tip speed limitations.

This information is then used as "input data" into a computer programmed to compute coordinate data for compressor or expander rotors and the special milling cutters required to machine male and female rotors in accordance with the computer developed design.

Computed rotor and cutting tool coordinate data is digitally stored in an electro-magnetic memory device. This data is then fed into a computer controlled high resolution plotting device to produce overlay charts for use in accurately inspecting cutters and rotors on an optical comparator having digital readout. Cutting tool coordinate data is then fed into the computer control of a traveling wire electric discharge machine and this machine tool is used to produce the precision hardened steel templates and high speed steel cutter blades required for use in the special milling cutters used in machining rotor profiles on male and female rotors. The cutter blades are assembled in the cutter bodies and the templates used in a "copying type" cutter grinder to grind the finished shapes on the cutter blades after assembly in the cutter bodies. Cutter blade profiles are finally inspected to enlarged scale overlay charts on an optical comparator.

Printed, hard copies of rotor and cutting tool coordinate data are preferably printed directly on a connected printer as output from the rotor/cutter computer design programs or from files created as output of rotor/cutter design programs and digitally stored in electro-magnetic memory devices.

The present invention is exemplified by rectangular ("X-Y") or polar coordinates (angular) to describe the profiles of male and female rotors in the plane of rotation rather than the use of radial lines, arcs or circles, elipses, trochoids, parabolas, involutes, hyperbolas and other geometric shapes as are used in the known patents. A computer is then used in conjunction with an "arc fit" routine to fit connecting arcs to specified coordinates and to thus determine the finished shape of the final rotor profile.

DESCRIPTION OF THE PREFERRED EMBODIMENTS

Figure 1:
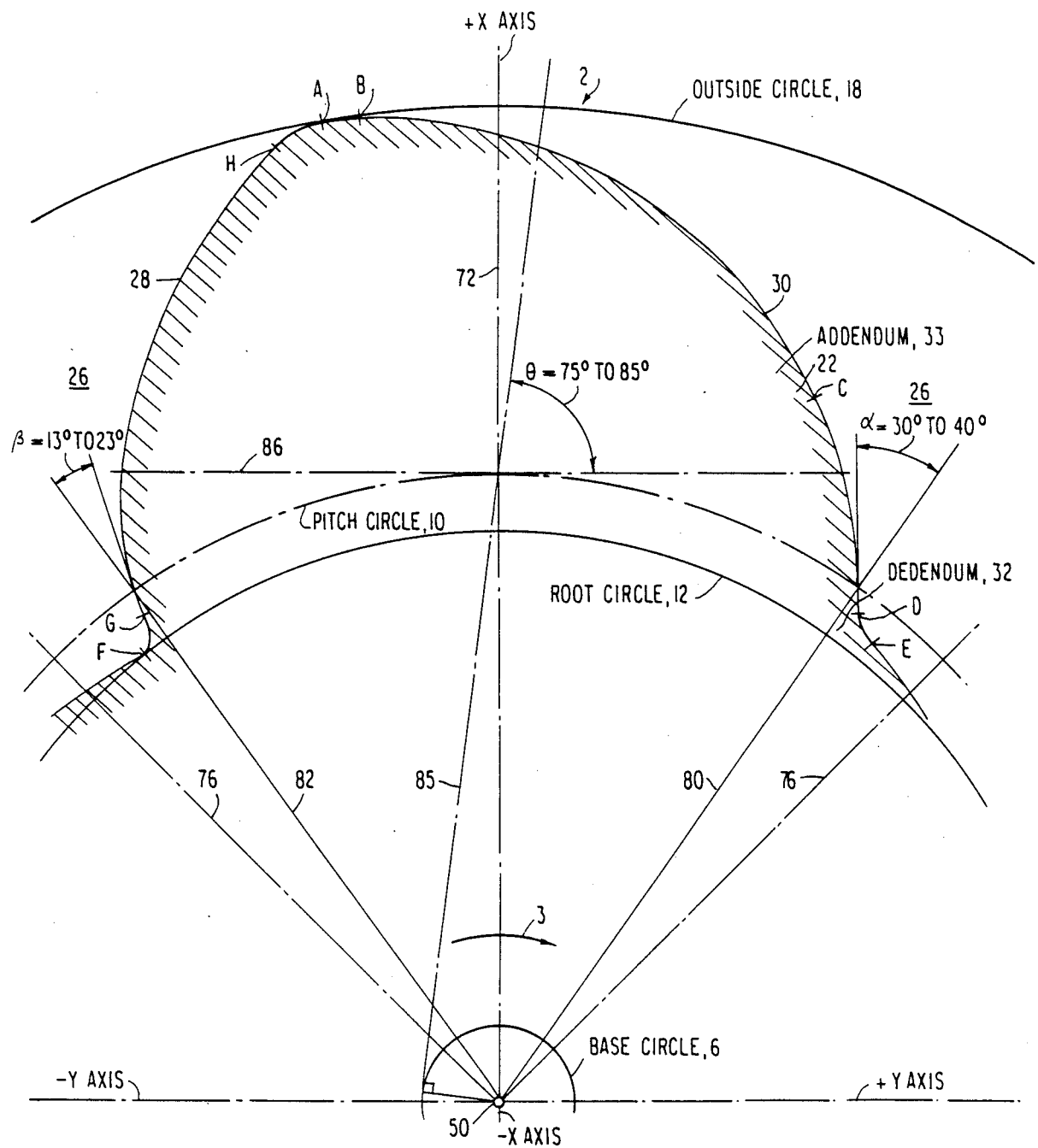
FIG. 1 is a fragmentary cross-sectional view in the plane of rotation of a male rotor constructed in accordance with the present invention and forming a first embodiment thereof.
Figure 2:
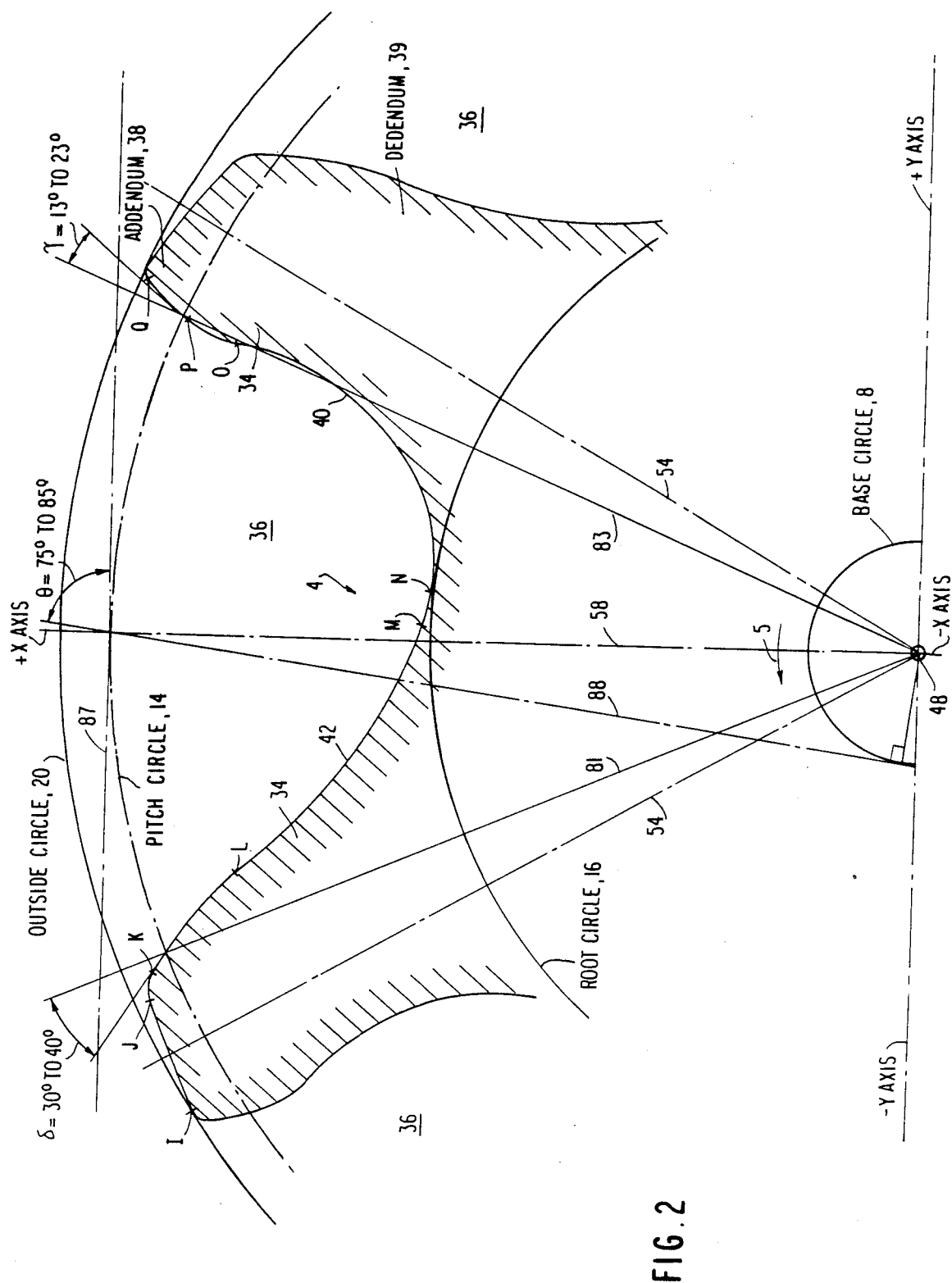
FIG. 2 is a fragmentary cross-sectional view in the plane of rotation of a female rotor forming a further embodiment of the present invention.

FIGS. 1 and 2 show respectively in transverse section relative to the axis of the rotors, the profiles of a helical screw male rotor, indicated generally at 2, and a helical screw female rotor, indicated generally at 4. Further, the profiles illustrate in FIG. 1, a single complete male rotor lobe and, in FIG. 2, female rotor lobes defining a groove therebetween. In customary practice, the profiles are described by outlining the method by which the profiles are developed over their complete exterior surface.

Unique to the present invention, the male and female rotor profiles are defined by computer generated convex and concave curves connecting points defined by "X" and "Y" coordinates. FIGS. 1 and 2 illustrate the various convex and concave curves which make up the male and female rotor profiles and also illustrate the "X" and "Y" axes and their intersection point at the center of the rotor, i.e., the rotor axis, which are used to locate computer generated coordinate points.

Figure 3:
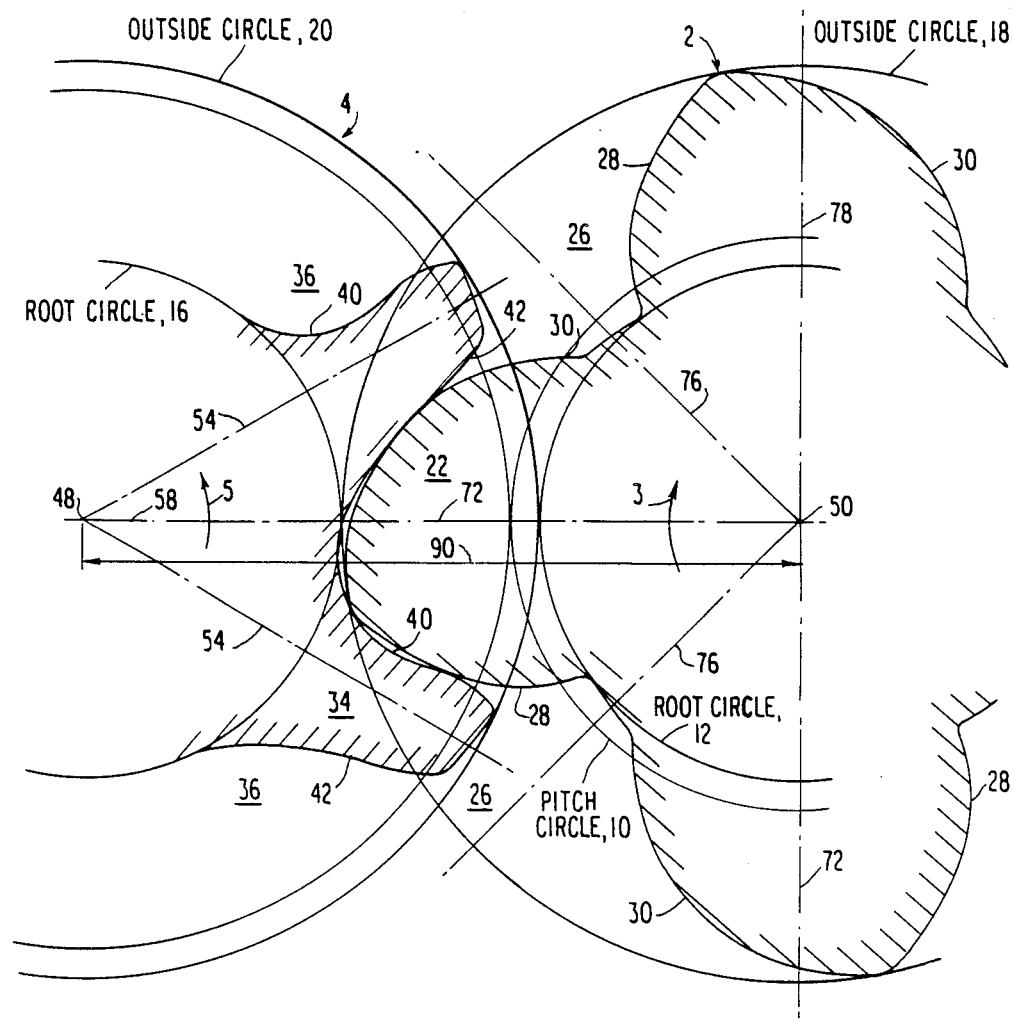
FIG. 3 is a cross-sectional view in the plane of rotation of a pair of intermeshed male and female helical screw rotors as illustrated in FIGS. 1 and 2 having four and six lobes, respectively.

Further, similar to the description found within U.S. Pat. No. 4,527,967, in the development of the rotor profiles, the operating parameters of the screw machine whether acting as a compressor or expander are initially determined. In the illustrated embodiment, the male rotor 2 functions to drive the female rotor 4, as per arrows 3 and 5, respectively, and the center distance between the rotors when intermeshed (as illustrated in FIG. 3), and which rotate within laterally intersecting rotor bores (not shown) are defined. The pitch diameters of the male and female rotors 2 and 4 are calculated and the related root diameters are derived from the relationship to the outside diameters of the mating rotors. Additionally, base circle 6 of male rotor 2 and base circle 8 of female rotor 4 are calculated from the product of the rotor pitch diameter and the cosine of the rotor pressure angle as will be seen hereinafter.

In FIG. 1, the pitch circle 10 for the male rotor is shown as outside the root circle at 12. For the female rotor 4, the pitch circle is indicated at 14 and the root circle at 16. As may be appreciated, the lobe thickness of the female rotor on the pitch circle is set at a predetermined value to provide suitable thermal conductivity and the necessary mechanical strength to avoid deformation or destruction under the forces of compression or expansion. The outside diameter circle is indicated at 18 for male rotor 2, and at 20 for female rotor 4. The radially projecting lobes 22 of the male rotor 2 form circumferential grooves 26 therebetween. The male rotor lobes 22 are provided with addendums 33 located radially outside of the pitch circle 10 and dedendums 32 located radially inside of the pitch circle 10.

Figure 4:
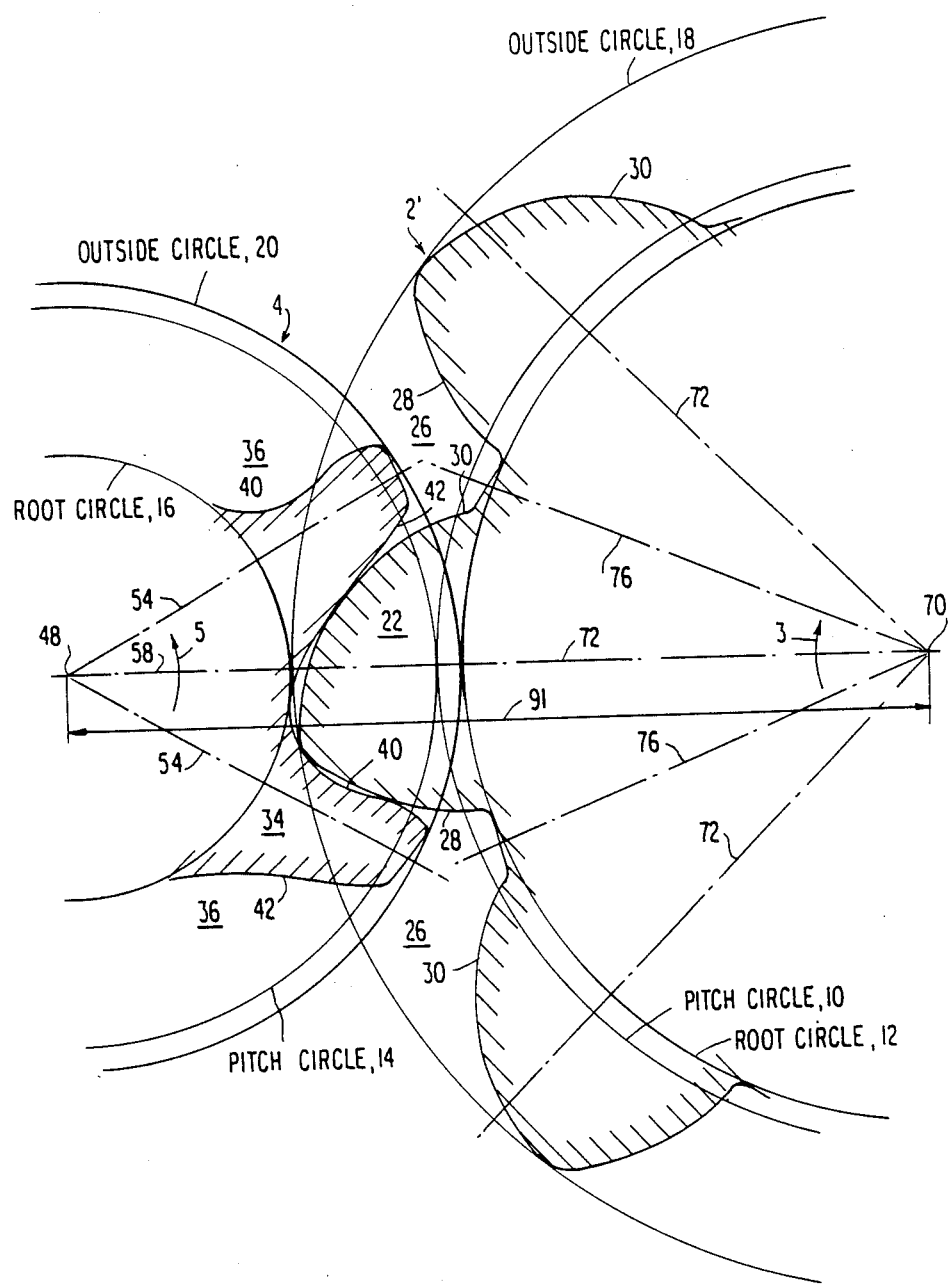
FIG. 4 is a cross-sectional view in the plane of rotation of a pair of intermeshed male and female screw rotors forming a further embodiment of the present invention and having eight and six lobes, respectively.
Figure 5:
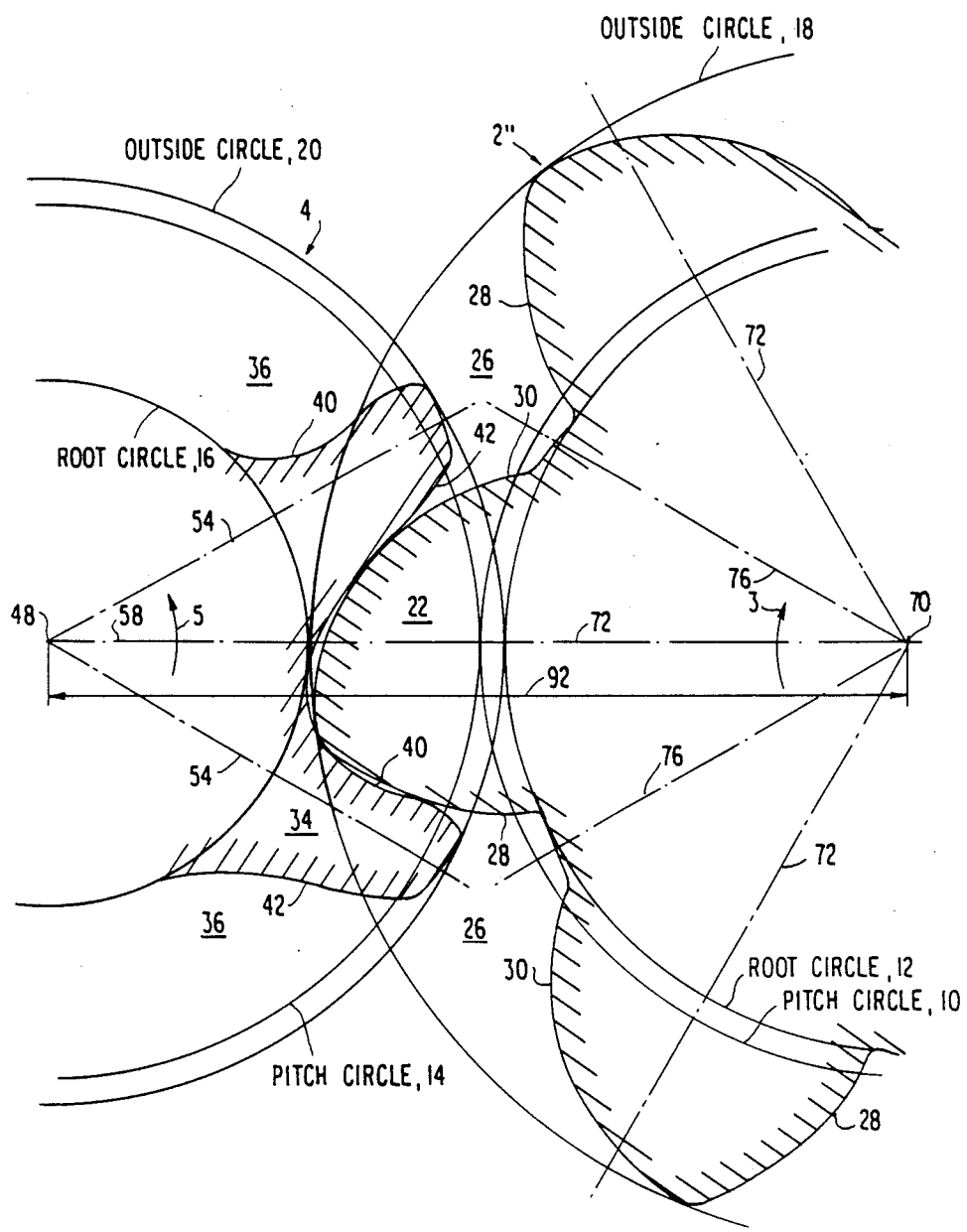
FIG. 5 is a cross-sectional view in the plane of rotation of a pair of intermeshed male and female rotors forming a further embodiment of the present invention and having six lobes for each rotor.

With the male rotor 2 having four helical lobes 22 and intervening grooves 26, the lobes 22 have a wrap angle of about 300°. In contrast, by viewing FIG. 4, the male rotor 2' has eight helical lobes 22 having a wrap angle of abut 150°. In FIG. 5, there is depicted a rotor set in which male rotor 2" has six helical lobes 22 and intervening grooves 26, with the lobes having a wrap angle of about 200°. For the various embodiments, like elements have like numerical designations. The same basic female screw rotor geometry is employed in all three embodiments irrespective of the change in diameter and number of lobes of the male driving rotors 2, in the embodiment of FIGS. 1-3, 2' in FIG. 4, and 2" in FIG. 5. The female rotor 4 in each instance has its six helical lobes or lands 34 separated by intervening grooves 36. The female rotor lobes 34 are provided with addendums 38 located radially outside of the pitch circle 14, while the male rotors 2, 2' and 2" have dedendums 32 located inside the pitch circle 10 of those rotors. The female rotor lobes 34 are completed by dedendums 39 inside the pitch circle 14. Each female rotor groove 36 is formed by a groove trailing flank 40 of lobe 34 when the machine is functioning as a compressor (assumed operation throughout this application) and which becomes the leading flank when operating as an expander. To the opposite side of the groove trailing flank 40 is a groove leading flank 42, when the machine functions as a compressor. That flank 42 becomes a trailing flank when the machine functions as an expander. Each of the flanks 40 and 42 extend from a radially innermost root portion of a groove concave surface portion N-O of the groove 36, out to the crest portions J-I of the respective adjacent lobes 34.

Similarly, for the male rotor 2 in FIGS. 1-3, each male rotor lobe trailing flank 28 and leading flank 30 extends from a radially innermost bottom or root portion of convex curve lobe portion E-F of each male lobe 22 out to the tip portion A-B. As may be appreciated, the radially innermost point forming a periphery of the male and female rotor lies on the root surface; for instance, for the male rotor 2, FIG. 1, that point is F. Referring to FIG. 1, the male rotor 2 has the lobe profiles defined by X and Y defined coordinate points, at positions A, B, C, D, E and F for the lobe 22 leading flank 30, and F, G, H, and A for the lobe 22 trailing flank 28. Profile curves stored in the computer and matched to these points complete the profile between the points defined above.

The profile changes which must occur on the six lobe female rotor to allow proper meshing with male rotors in accordance with this invention when the number of male rotor lobes increases or decreases to increase or decrease screw rotor machine capacity are discussed below.

The outside diameter, pitch diameter, root diameter, arc lobe thickness at the pitch circle and base circle diameters from which involute portions I-J, K-L, M-N and P-Q are generated remain the same regardless of the number of lobes in the mating male rotor. For this reason these portions are identical on the female rotors shown in FIGS. 3, 4 and 5, Portion L-M is generated by radius B-C of the male rotor and portion N-O is generated by radius H-A of the male rotor. The profiles of these portions are created by the generating action of male and female rotors meshing together and rolling with "zero" sliding at the pitch circles and for this reason mating male rotors having greater or fewer numbers of lobes in the mating male rotor is either increased or decreased.

This Table lists the X and Y coordinates for the key points on 100MM four and six lobe male and female rotors in accordance with the present invention.

| EXAMPLE 1 COMPUTER STORED COORDINATES FOR 100 MM ROTOR PROFILES OF FIGS. 1, 2 AND 3 | | | |
| --- | --- | --- | --- |
| | LOCATION POINT | X | Y |
| MALE ROTOR 2: | A | 1.9372 | −0.3469 |
| | B | 1.9418 | −0.2842 |
| | C | 1.4016 | .6179 |
| | D | 0.9578 | 0.7087 |
| | E | 0.8981 | 0.7292 |
| | F | 0.8769 | −0.6949 |
| | G | 0.9580 | −0.6893 |
| | H | 1.8965 | −0.4279 |
| FEMALE ROTOR 4: | I | 1.6223 | −1.1146 |
| | J | 1.7334 | −0.8488 |
| | K | 1.7279 | −0.7868 |

-continued

EXAMPLE 1
COMPUTER STORED COORDINATES FOR 100 MM
ROTOR PROFILES OF FIGS. 1, 2 AND 3

| LOCATION POINT | X | Y |
| --- | --- | --- |
| L | 1.5451 | −0.5481 |
| M | 1.1306 | 0.0468 |
| N | 1.1241 | 0.0693 |
| O | 1.5862 | 0.67556 |
| P | 1.6817 | 0.7212 |
| Q | 1.7743 | 0.8137 |

Because the resulting profile changes are minor, it is possible to use the same roughing cutters and work holding fixtures for a range of compressor or expander sizes and slight modifications in the finishing cutters rather than completely different roughing, finishing cutters and work holding equipment for each size as is the case today.

As a very important aspect of the present invention, the rotor profile for the male rotor 2 utilizes coordinate defined convex curves B-C and C-D on the leading flank 30 of the male lobe 22 and coordinate defined convex curves between points G-H and H-A on the trailing flank 28 of male lobe 22.

Coordinate defined convex curve A-B forms the tip of the lobe 22 on the male rotor 2, while coordinate defined convex curve E-F forms the root portion of the male rotor 22 profile. Coordinate defined concave curves D-E and F-G form portions of the leading flank 30 and trailing flank 28 and connect via coordinate defined convex curve E-F at opposite ends thereof.

Turning to the female rotor 4, FIGS. 2 and 3, coordinate defined convex curve K-L on the leading groove flank of the female rotor lobe 34, is computer generated by portion C-D of the leading flank of male rotor lobe 22 and forms a very important aspect of the first embodiment of the invention. Coordinate defined concave curve L-M on the leading groove flank of the female rotor lobe 34, is computer generated by portion B-C of the leading flank of male lobe 22.

Additional aspects of female rotor 4 line in the coordinate defined convex curve P-Q on the trailing groove 40 of the female rotor lobe 34 which is computer generated by portion G-H of the trailing flank 28 of male rotor lobe 22. Likewise, coordinate defined concave curve N-O which is computer generated by tip portion A-B of the trailing flank 28 of male rotor lobe 22, forms a further important aspect of the rotor profile of female rotor 4. The coordinate defined convex curve female rotor tip lobe 34 portions I-Q and J-K are computer generated by male rotor lobe 22, root portions F-G and D-E. The present invention in all embodiments incorporates the use of convex curve portions C-D of the leading groove flank 30 of the male rotor lobe 22 for driving convex curve portion K-L of the leading groove flank 42 of female rotor lobe 34. The slope of these curves at the pitch circle 10 of male rotor 2 and pitch circle 14 of female rotor 4 form angles α, δ at between 30° and 40°, with radial lines 80, 81, respectively, originating at male rotor center 50 and female rotor center 48, respectively, and intersecting portion C-D at the pitch circle 10 of male rotor 2 and portion K-L at pitch circle 14 of female rotor 4. This driving and driven contact occurs in situations when male rotor 2 is the driving member and in this case the majority of lobe driving and driven action occurs outside of the male pitch circle 10 and inside female pitch circle 14. Thus, the majority of lobe contact happens beyond the line of centers in the arc of recession where the direction of sliding on male rotor 2 is away from pitch circle 10 and on female rotor 4 is toward the pitch circle. This contact is a lapping, polishing type of lobe action which increases mechanical drive efficiency and minimizes wear.

In situations where the female rotor 4 is the driving member and the male rotor 2 is the driven member, the curvatures of mating portions C-D and K-L still provide an effective seal between high and low pressure volumes of the elastic working fluid in the compressor or expander.

The present invention is also directed to the use of convex curve portion G-H of the trailing flank 28 of male lobe 22 as a very effective surface when driven by convex curve portion P-Q of the trailing groove flank 40 of female rotor lobe 34. The slope of these curves at pitch circles 10 of the male rotor 2 and 14 of the female rotor 4 define angles $\beta$, $\tau$, respectively, of between 13° and 23° with radial lines, 82, 83 originating at male rotor center 50 and female rotor center 48, respectively, and intersecting portion G-H at pitch circle 10 of male rotor 2, and portion P-Q at pitch circle 14 of female rotor 4, respectively. This driven and driving contact occurs in situations when female rotor 4 is the driving member. In this case a large portion of lobe driving and driven action occurs behind the line of centers in the arc of approach. "Approach" action is less desirable than recess action due to a reversal in the direction of sliding resulting in lobe surfaces which are more susceptible to wear. Convex curve trailing groove portion P-Q and concave curve portion N-P of female rotor lobe trailing flank 40 blend smoothly to form an uninterrupted curved surface which results in a decreased tendency for mating surfaces to wear. In situations where male rotor 2 is the driving member and the female rotor 4 is the driven member, the curvatures of mating portions G-H and P-Q provide an effective seal between high and low pressure volumes of the elastic working fluid in the compressor or expander.

A particularly important aspect of the present invention involves the utilization of involute curves for the male rotor lobe tip portion A-B, and the root portion E-F thereof which mate with respective involute curves on female lobe groove portion M-N, and tip portion I-J thereof. This feature not only results in mating surfaces having low leakage paths between high and low pressure volumes in the rotor mesh, but also creates ramps on the lobe tips of both male and female rotors, the high points of which act as sealing strips between male and female rotor lobe tips and the screw rotor machine casing or housing. The narrow rotor tip lands will be quickly worn away in the event of a catastrophic failure in the sealing liquid injection system with the resulting temperature increase and expansion of male and female rotors and thus function as a safety feature preventing destruction of the screw rotor machine. In addition, the use of involute curves in male and female tip and root locations simplifies rotor geometry and results in universal computer programs which are applicable to a wide range of rotor lobe addendums, dedendums, and lobe thicknesses as required for high and low pressure applications. In addition involute curve geometry in male and female tip and root locations permits the use of a single computer program to calculate X and Y coordinates for various lobe combinations, some of which are illustrated in FIGS. 3, 4 and 5. This has not been possible in the applicant's prior inventions and not, to the applicant's knowledge, possible in other prior art. These features are particularly important for the capacity control aspect of the present invention which is described hereinafter.

In that respect the involute convex curve portions A-B of the tip portion of the male rotor lobe 22 forms a very effective seal when mating with convex involute portion M-N of the root of the female rotor groove 36. In the same manner, convex involute tip portion I-J of female rotor lobe 34 forms a very effective seal when mating with convex curve portion E-F of the root of male rotor groove 26. The operating pressure angles, $\epsilon$ on male rotor 2 and $\theta$ on female rotor 4 fall between 75° and 85° and must, to result in conjugate action and effective sealing, be identical on both male and female rotors. Base circles 6 on male rotor 2 and 8 on female rotor 4 are calculated as the product of the rotor pitch diameter and the cosine of the rotor pressure angle.

Base circles 6 and 8 which are used to develop involute curves A-B and E-F on the tip and root portions of male rotor 2 and involute curves I-J and M-N on the tip and root portions of female rotor 4 are based on 75° and 85° pressure angles, dimensioned in a similar manner to those of U.S. Pat. No. 4,028,026.

Line 85 target to base circle 6 and intersecting line 86 normal to the pitch circle 10 at its intersection with male rotor lobe center line 72 defines with the normal 86 the pressure angle $\epsilon$, for male rotor 2, FIG. 1. Similarly, in FIG. 2, female rotor groove center line 58 intersects pitch circle 14 with line 87 normal to the pitch circle, at that intersection. Line 88 target to the base circle 8 for female rotor 4 defines with normal line 87 pressure angle $\theta$, also of between 75° and 85°.

The present invention makes use of convex curve tip portion H-A at the trailing flank 28 of male rotor lobe 22 which forms a very effective seal when mating with concave curve portion N-P on the trailing groove flank 40 of female lobe 34.

Further, convex curve portions I-Q and J-K at the lobe tip of female rotor lobe 34 seal effectively when mating with concave curve portions F-G and D-E, respectively, at the root portion of the male rotor lobe 22.

Another aspect of the present invention may be appreciated by comparing the eight lobe male rotor in mesh with the six lobe female rotor for a compressor rotor set in FIG. 4, in contrast to the arrangement of FIG. 3 previously described in detail, which shows a four lobe male rotor in mesh with a six lobe female rotor. If the outer diameter, root diameter, pitch diameter, length to diameter ratio (L/D) and the basic lobe proportions of the female rotor 4 in FIG. 4 are the same in this set as that shown in FIG. 1, then the center distance 91 between the rotors 4 and 2' shown in FIG. 4 must be 1.4 times the center distance 90 between the rotors shown in FIG. 3. Of course, in viewing FIG. 4, it should be appreciated that the male rotor 2' is different, primarily with respect to its diameter and to enlarged outside circle 18', which is necessarily required to permit the eight male lobes 22 thereof to be essentially identical in size and configuration to the four male rotor lobes 22 of male rotor 2 in FIG. 3. Based upon identical male rotor rotational speeds (rpm's) the capacity of the screw rotor machine using the two rotors 2' and 4 in FIG. 4 will be approximately two times the capacity of a screw rotor machine using the rotors 2 and 4 in FIG. 1.

A similar comparison may be seen between FIGS. 3 and 5, FIG. 5 shows a six lobe female rotor having the same six lobe female rotor 4, with the same outer diameter, root diameter, pitch diameter and lobe proportions as those shown in FIGS. 2, 3 and 4. The mating male rotor 2'', in this case also has six lobes and would operate at a center distance 92 which is 1.2 times the center distance shown in FIG. 1. The center distance 92 of course is the distance between the center or axis 50 of male rotor 2'' and center 48 of female rotor 4, FIG. 5. Based upon identical male rotor rotational speed for male rotor 2'', the capacity of a screw rotor machine using rotors 2'' and 4 as shown in FIG. 5 will be approximately 1.5 times the capacity of the screw machine using the rotors of FIG. 3.

Using the same logic it is possible to design and manufacture a series of screw machines having a wide range of capacities by using identical female rotors having lobe profiles in accordance with the present invention with the same basic diameters, dimensions and numbers of lobes mating with a series of male rotors having essentially the same lobe profiles in accordance with the present invention but with a varying number of lobes, i.e., four, six, eight, etc.

The profiles shown and described are reproducible over a wide range of rotor sizes employed in actual practice. Although the rotors illustrated in FIGS. 1, 2, 3, 4 and 5 involve identical six lobe female rotors 4 and four, six, and eight lobe male rotors 2', 2 and 2'' respectively, the invention has application to intermeshed helical screw rotors having a greater, or lesser number of lobes. Further, the rotors in accordance with the present invention may have their pitch diameters and center distances vary as needed without departing from the scope of the invention.

A very important aspect of the present invention concerns the use of a computer, programmed to compute coordinate data describing the profiles of male and female rotors in the preferred embodiments and the cutting tools required to produce them.

Figure 6:
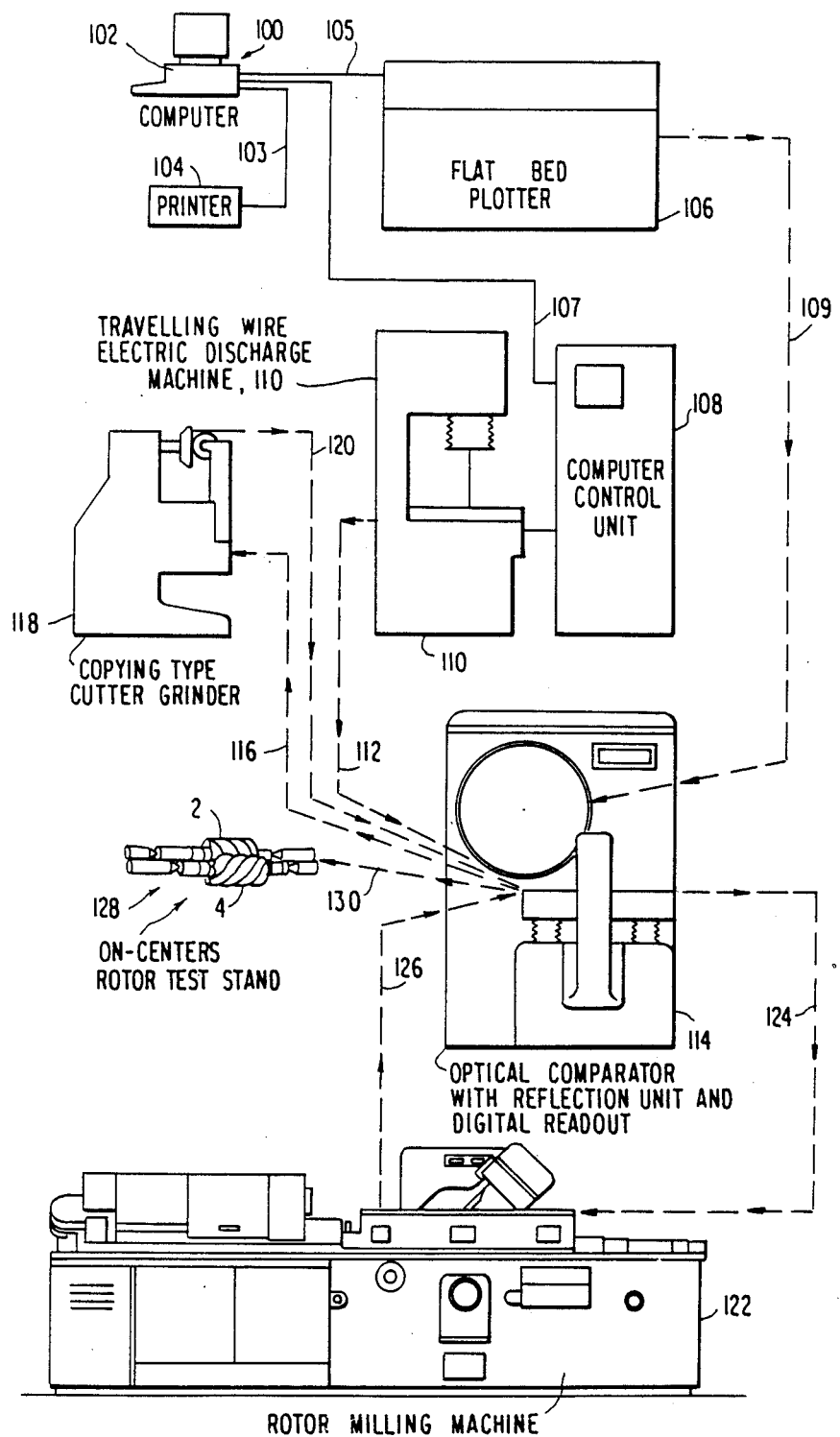
FIG. 6 is a data flowchart illustrating a typical computer controlled plotter and wire electric discharge machine for the manufacture of screw rotors of the present invention.

FIG. 6 is a diagram illustrating how coordinate data, the output of a computer 100 programmed to design compressor and/or expander screw rotors, in the embodiments described previously flows from digital storage in the computer memory or integral magnetic memory device 102 ("hard" and/or "floppy" disk drive systems) on line 103, to a directly connected printer 104 for "hard" copy, to a computer controlled high resolution plotter 106 for producing high accuracy enlarged scale overlay charts for use in optically inspecting rotors, templates and milling cutters, via flow path 109, and to the directly connected computer control unit 108 of a travelling wire electrical discharge machine 100 via line 107 which produces high accuracy templates for use in finish grinding rotor milling cutters and for producing semi-finished hardened "high speed" steel milling cutter blades, complete with secondary cutting angles, ready for finish grinding after being assembled in milling cutter bodies.

FIG. 6 further illustrates the flow path at 112 of templates and milling cutter blades from the wire electric discharge machine 110, where they are produced, to the optical comparator 114 where they are optically inspected using overlay charts and digital readout of coordinates on an optical comparator equipped with a surface illumination and reflection unit. After optical inspection and approval, templates and cutter blades are moved as per flow path 116 to the "copying type" cutter grinder 118 where the templates are used to control the path of the grinding wheel which produces the finish profiles on the assembled milling cutter blades.

Rotor milling cutters, finish ground on the "copying type" cutter grinder 118, are inspected and approved on the optical comparator as per flow path 120 and are then ready for use in producing screw rotors, in the preferred embodiment, on a rotor milling machine 122, flow path 124.

The "plane of rotation" profiles of male and female rotors produced on the rotor milling machine are inspected on the optical comparator, as per flow path 126 by reflecting and magnifying the rotor profile images through the mirror and lens system to the screen where the profiles are compared to the enlarged scale overlay charts and coordinate inspected using the digital read-out system.

Final inspection of mating male and female rotors, as at 2, 4, respectively, FIG. 6, for interlobe clearances, backlash, proper lobe contact patterns, concentricity of rotor elements and free rotation is performed by mounting the rotors 2, 4 on centers at a center distance representing the design center distance in the screw rotor machine on a precision rotor test stand indicated generally at 128, via flow path 130. Interlobe clearances are measured with "feeler" gauges. Concentricities and backlash measurements are completed by using 0.0001 inches resolution, electronic, "digital readout" indicators. Lobe contact patterns are inspected visually by use of "marking fluid" and slow rotation to transfer marking from one rotor to the other. Free rotation is checked by "fast" hand rotation of the driving member while observing smoothness of action and noise level of the two mating rotors.

Rotor test stand 128 inspection completes the cycle which started with the rotor design requirements "input" to the computer 100. The rotors 2, 4 are now complete and ready for assembly in the screw rotor compressor or expander machine.

To summarize, screw rotor and cutter design data flows from computer to printer and to plotter and wire electric discharge machine. Cutter grinding templates and cutter blades (complete with secondary cutting clearances) are produced on the travelling wire electric discharge machine and are inspected on the optical comparator to coordinates calculated on the computer and to overlay charts produced on the plotter. Templates are then used on the "copying type" cutter grinder to produce the final shape and primary cutting clearances on the cutter blades after assembly in the cutter body. The cutters are then inspected on the optical comparator before being used on the rotor milling machine to produce rotors in accordance with the preferred embodiment as described by computer output data. The rotor profiles are final inspected on the optical comparator and completed rotors are inspected on an "on centers" test stand for interlobe clearances, backlash, lobe contact, concentricity and free rotation.

The involute curve portions A-B and E-F on the male rotor and I-J and M-N on the female rotor in these areas are unique and a very important aspect of this invention. Because these curves are involutes and because the intersection of the involute curves and the pitch circles occurs a great distance beyond the confines of the drawings specification of pressure angles rather than slopes of the curves as related to radial lines is preferred, it has been used in prior patents, including my U.S. Pat. No. 4,445,831, utilizing involute curves and as defined in column 2, lines 18-29 of U.S. Pat. No. 4,028,026.

Concerning the points of demarcation between involute curves and adjacent curves, the lobe profile geometry is determined based upon the location of features in reference to pitch circles, root circles and outer diameter circles. The profiles are then designed to provide maximum sealing between high and low pressure volumes, minimum trapping of working fluids and efficient transmission of rotary motion from male to female rotor or vice versa. In the present invention, as per male rotor 2, FIG. 1, convex curve B-C was originally a true radius whose center was located on a radius equal to $0.83745 \times$ the pitch circle radius. The computer program then calculated the size of this radius and the coordinates of demarcation points B and C. As to female rotor 4, FIG. 2, convex curve J-K was originally a true radius having its center located on the pitch circle. The computer program then calculated the size of this radius and the coordinates of demarcation points J and K.

Concerning pressure angle selection, a high pressure angle results in a short line of contact and a good condition concerning leakage. A short line of contact reduces the possibility of leakage. A high pressure angle is desirable on the male leading lobe side and the female leading groove side. On the male trailing lobe side and the female trailing groove side a high pressure angle would reduce the length of the line of contact resulting in a favorable condition regarding leakage back to suction but would result in a large "blow hole" connecting adjacent compression chambers. Pressure angle selection on the trailing side is essentially a "trade off" which resulted in the 13° to 23° slope specified.

The basic steps in the process of manufacture of a rotor, whether machined by milling, hobbing or grinding are:

1. Determine and describe the profile of rotor in plane of rotation.
2. Establish the wrap angle and length/diameter ratio needed for correct design of compressor or expander.
3. Establish the diameter of the cutting tool or grinding wheel.
4. Determine the correct profile of the milling cutter, hob or grinding wheel.

Note, this is now usually accomplished by a computer iteration process. Rotors are produced by milling and the computer determines the cutter shapes. One then manufactures Templates which then duplicate the cutter shapes. Cutters may be ground on a "Holroyd" cutter grinder which utilizes these templates. Some manufacturers, particularly those using rotor hobbing machines, depend on the tool manufacturer to determine the cutter profiles and supply cutters having proper profiles.

5. Inspect the rotors produced to theoretical coordinates by the use of an optical comparator or a coordinate measuring machine and by mating male and female rotors at the theoretical center distance on a rotor test stand and precisely measuring concentricities, interlobe clearances, backlash and smoothness of operation.
6. Assemble the rotors in a screw rotor machine and test extensively on a test stand utilizing a dynamometer, receiver, oil separator, pressure and temperature gauges and other instrumentation needed to determine the efficiency and overall performance of the unit.

While the invention has been particularly shown and described with reference to a preferred embodiment thereof, it will be understood by those skilled in the art that various other changes in form and details may be made therein without departing from the spirit and scope of the invention.

What is claimed is:

1. A male rotor for a screw rotor machine comprising:
   an elongated formed male rotor rotatable about a central longitudinal axis and having a pitch circle centered on said axis;
   a plurality of elongated helical lobes extending longitudinally of said male rotor, and circumferentially spaced about said pitch circle so as to provide intervening grooves therebetween forming addendums outside said pitch circle and dedendums inside said pitch circle;
   a major portion of each of said lobes extending generally radially outwardly from said pitch circle;
   the profile of each of said lobes in a plane perpendicular to said axis, having a tip portion, a root portion, and respective, generally convex lobe, leading and trailing flank portions extending intermediate said tip portion and said root portion of a respective adjacent groove:
   the improvement wherein said male rotor lobe tip portion and root portions are involute curves for generating mating involute groove root and tip portions of a female rotor for said screw rotor machine when the rotors are in mesh, resulting in male and female rotor mating surfaces having low leakage paths between high and low pressure volumes with the rotors in mesh, and said lobe tips of said male rotor each including a ramp having a high point acting as a sealing strip between male and female rotor lobe tips and a screw rotor machine casing, thereby simplifying rotor geometry.

2. The male rotor as claimed in claim 1 wherein said involutes are generated from a base circle for said male rotor, and wherein said base circle is based upon a pressure angle in the range of 75° to 85°.

3. A female rotor for a screw rotor machine comprising:
   an elongated formed female rotor rotatable about a central longitudinal axis and having a pitch circle centered on said axis, said rotor having an outer diameter;
   a plurality of elongated helical lobes extending longitudinally of said rotor and circumferentially spaced about said pitch circle so as to provide intervening grooves therebetween, forming addendum portions outside the pitch circle and dedendum portions inside the pitch circle;
   a major portion of each of said lobes extending generally radially inwardly of said pitch circle;
   the profile of each of said lobes in a plane perpendicular to said axis, having a tip portion and respective, generally concave groove leading and trailing flank portions extending intermediate said tip portion and a root portion of the respective adjacent grooves;
   said lobes of said female rotor engageable with grooves of a male rotor defined by corresponding helical lobes with contact between the flank portions of respective female and male rotors during rotation of one rotor relative to the other, and in mesh therewith;
   the improvement wherein the profile of the grooves of said female rotor at said female rotor lobe tip portion and said root portion are defined by involute curves which mate with respect to involute curves on the male rotor root portion and male rotor lobe tip portions, respectively, resulting in mating surfaces having low leakage path between high and low pressure volumes in the rotors when in mesh, and said lobe tips of said female rotor, each having a ramp with a high point which acts as a sealing strip between the male and female rotor lobe tips and the screw rotor machine casing thereby simplifying rotor geometry.

4. The female rotor as claimed in claim 3 wherein said female rotor involute curves are generated from a base circle, and wherein said base circle is based upon a pressure angle within the range of from 75° to 85°.

* * * * *